S. T. BANE.

Toe-Weight for Horseshoes.

No. 8,931. Reissued Oct. 14, 1879.

Attest:
A. Barthel
E. P. Sprague

Inventor:
S. T. Bane
By Atty
Robt S. Sprague

N. PETERS, PHOTO-LITHOGRAPHER, WASHINGTON, D. C.

UNITED STATES PATENT OFFICE.

SETH T. BANE, OF DETROIT, MICHIGAN.

IMPROVEMENT IN TOE-WEIGHTS FOR HORSESHOES.

Specification forming part of Letters Patent No. 187,582, dated February 20, 1877; Reissue No. 8,931, dated October 14, 1879; application filed September 8, 1879.

*To all whom it may concern:*

Be it known that I, SETH T. BANE, of Detroit, in the county of Wayne and State of Michigan, formerly of Chatham, Province of Ontario, Canada, have invented an Improvement in Toe-Weights for Horseshoes, of which the following is a specification.

The object I have in view is the construction of a horseshoe in such a manner that toe or side weights can be attached or removed without cutting the hoof or using straps; and it consists, mainly, in forging clips on the edge of the shoe, extending up the front or the side of the hoof, and in forming the weight with a recess on the inner face, to receive the clip and lie flat on the hoof, it being secured by one or more tap-bolts, as more fully hereinafter set forth.

Figure 1:
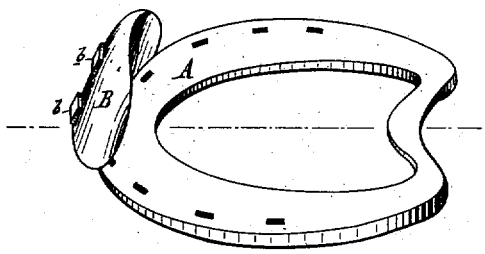
Figure 2:
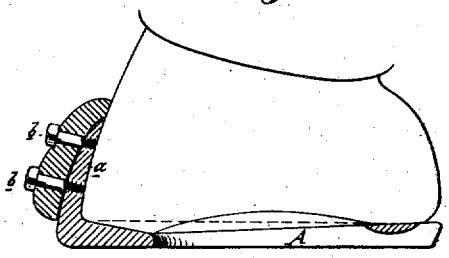
Figure 3:
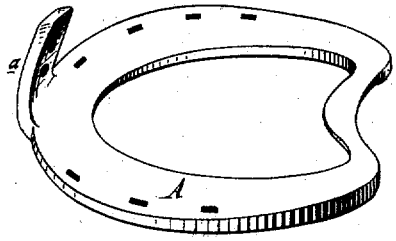

In the drawings, Figure 1 is a rear perspective view of a shoe and toe-weight. Fig. 2 is a longitudinal vertical section of the same, and Fig. 3 is a view of the shoe and clip.

In the accompanying drawings, which form a part of this specification, A represents an ordinary bar-shoe, forged with a toe-clip, *a*, extending up the front of the hoof a greater distance than an ordinary holding-clip. B is a toe-weight, adapted to the contour of the hoof on its inner face, in which there is cast a recess, which receives the clip *a*, and allows the weight to lie flat against the hoof. The weight is secured to the clip by one or more bolts, *b*, tapped into the latter, as shown.

The advantage of this construction, is that the weight can be applied without the use of straps, or without a clip inserted between the shoe and hoof, necessitating the cutting of the latter to receive it. If the bolts turn loose, they can be readily tightened, and when not required they can be removed, when the clip serves to support the shoe on the hoof.

The clip can be forged on the side of a shoe, if intended to carry a side weight. If the weight should work off, it cannot tear off the shoe, as does a weight having a hook to insert under the hoof.

I prefer to make the weight of some alloy of a ductile nature, so that the edges of the weight can be peened to fit the hoof. This, however, does not form an essential part of the invention set forth and claimed.

What I claim as my invention is—

1. In combination with a horseshoe provided with a clip integral therewith, a toe-weight provided with a recess on its inner face, adapted to partially inclose said clip and allow such weight to rest against the hoof, substantially as shown and described.

2. A horseshoe provided with a clip or clips forged or cast thereon, adapted to receive and hold a toe-weight constructed to fit upon such clip or clips, substantially as and for the purposes specified.

3. The combination, with a horseshoe provided with a clip or clips forged or cast thereon, of a recessed weight adapted to fit upon such clip or clips, and to be secured thereto by means of screw-bolts, substantially as and for the purpose described.

SETH T. BANE.

Witnesses:
H. S. SPRAGUE,
A. BARTHEL.